UNITED STATES PATENT OFFICE.

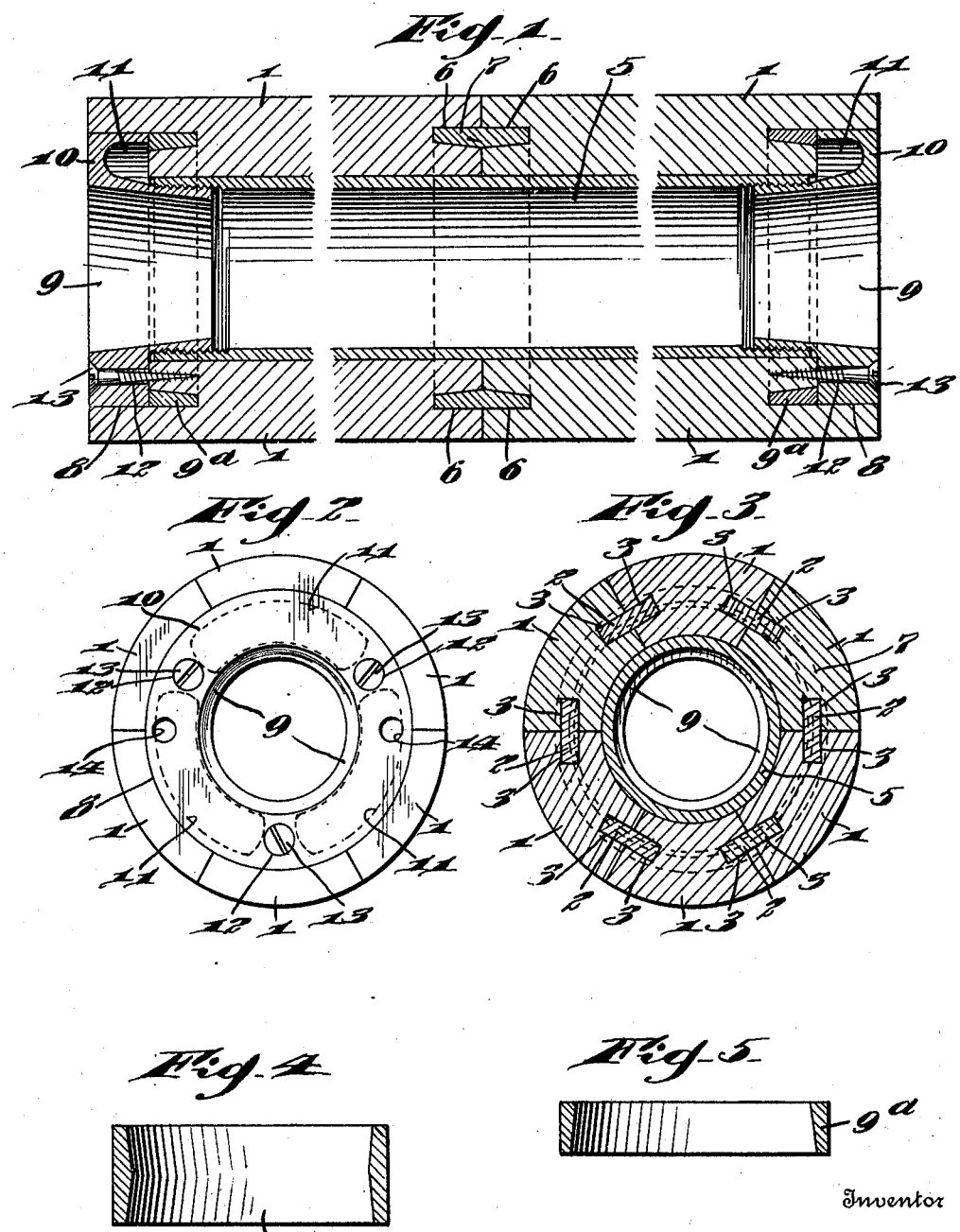

FREDERICK A. VIESER, OF CAMDEN, NEW JERSEY.

PRINTING-ROLL FOR LINOLEUM AND OIL-CLOTH.

978,080.     Specification of Letters Patent.     Patented Dec. 6, 1910.

Application filed July 5, 1910. Serial No. 570,328.

*To all whom it may concern:*

Be it known that I, FREDERICK A. VIESER, a citizen of the United States, residing at Camden, in the county of Camden and State of New Jersey, have invented certain new and useful Improvements in Printing-Rolls for Linoleum and Oil-Cloth, of which the following is a specification.

My invention relates to improvements in printing rolls for linoleum and oil cloth, the object of the invention being to construct a roll of this character made up of sections of wood battened together into cylindrical form and secured tightly around a cylindrical metal tube having bearing rings of improved construction screwed into the ends thereof and flush with the ends of the wooden roll.

A further object is to provide a roll of this type which will maintain its cylindrical form, sustain a great amount of wear, and which will most effectually perform the functions for which it is intended.

With these and other objects in view, the invention consists in certain novel features of construction and combinations and arrangements of parts, as will be more fully hereinafter described and pointed out in the claims.

In the accompanying drawings: Figure 1, is a broken view in longitudinal section illustrating my improvements. Fig. 2, is an end view. Fig. 3, is a view in cross section. Fig. 4, is a view in section through the central ring 7, and Fig. 5, is a view in section through one of the end rings 9$^a$.

The roll comprises a circular series of longitudinal strips 1, having their meeting edges beveled or inclined and secured together by glue as well as by batten strips 2 glued into registering grooves 3 in the strips. The outer and inner faces of the roll thus made are turned into circular form, and in the said roll a cylindrical tube 5 is positioned fitting the tube snugly.

As will be noted particularly in Fig. 1, the roll is made up not only of a circular series of strips 1, but also in two sections as it is difficult to obtain the strips 1 of sufficient length for a complete roll. The metal tube 5 however, extends practically throughout the length of the entire roll, so that the ends of the two wooden sections are preferably brought together at the center of the roll, and these sections in their meeting ends are made with a circular recess or groove 6, into which the connecting ring 7 illustrated in Fig. 4 is positioned.

The outer face of this ring 7 is straight and smooth, but the inner face tapers outwardly from its intermediate portion to its edges, constituting in effect, double circular wedges exerting a cam action on that portion of the wooden strips between the ring and tube 5, so as to tightly wedge the wooden strips around the tube 5 and securely lock the same together.

The ends of the roll formed by the wooden strips 1 are provided with circular recesses 8, and concentric with the walls of these recessed ends, the wooden strips are provided with circular grooves or recesses into which locking rings 9$^a$ are driven. These rings 9$^a$ have straight outer walls, and tapering inner walls, which serve to force that portion of the wooden strips between the ring and the tube 5, into tight engagement with the tube and securely lock the parts together.

The ends of the tube 5 are internally screw-threaded to receive external screw-threads in bearing rings 9, the latter screwed into the tubes and having enlarged circular heads 10 to fit into the recesses 8, bearing against the rings 9 and holding them securely in the roll. These enlarged heads 10 are preferably recessed on their inner faces, as indicated at 11 to lighten the structure, and are provided with openings 12 in which screws 13 are countersunk and forced into the wooden strips 1 to secure the rings 9 against accidental turning. These rings 9 are also provided with openings 14, for the reception of a spanner wrench to turn them in screwing them home or removing them from the roll. These rings 9 act as bearings for the rolls on its supporting journal, and are preferably of slightly conical bore, but I am not limited in this particular.

Various slight changes might be made in the general form and arrangement of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A roll of the character described, composed of a circular series of longitudinal wooden strips battened together, said roll having circular grooves in its ends, a tube within the roll, and wedge rings forced into said grooves, substantially as described.

2. A roll of the character described, composed of a circular series of longitudinal wooden strips battened together, said roll having circular grooves in its ends, a tube within the roll, wedge rings forced into said grooves, and bearing rings screwed into the ends of the tube, and bearing against said wedge rings, substantially as described.

3. A roll of the character described composed of a circular series of longitudinal wooden strips battened together and having circular grooves in its ends, a tube within said roll, said roll having circular recesses in its ends, wedge rings having beveled or inclined inner faces located in the said grooves, and bearing rings screwed into the tube and enlarged heads on said bearing rings located in said recesses, and bearing against the wedge rings, substantially as described.

4. A roll of the character described composed of a circular series of longitudinal wooden strips battened together and having circular grooves in its ends, a tube within said roll, said roll having circular recesses in its ends, wedge rings having beveled or inclined inner faces located in the said grooves, and bearing rings screwed into the tube and enlarged heads on said bearing rings located in said recesses, and bearing against the wedge rings, said circular series of longitudinal wooden strips having members abutting at the center of the roll, grooves in the adjacent ends of said strips, and a table wedge ring located in said last-mentioned grooves coöperating with the first-mentioned groove, rings to bind the wooden strips against the inner tube, substantially as described.

In testimony whereof I have signed my name to this specification in the presence of two subscribing witnesses.

FREDERICK A. VIESER.

Witnesses:
C. R. ZIEGLER,
C. E. POTTS.